March 27, 1945. J. W. TREW 2,372,617
METHOD OF PRODUCING COMPOSITE PANELS
Filed Dec. 31, 1942 2 Sheets-Sheet 1
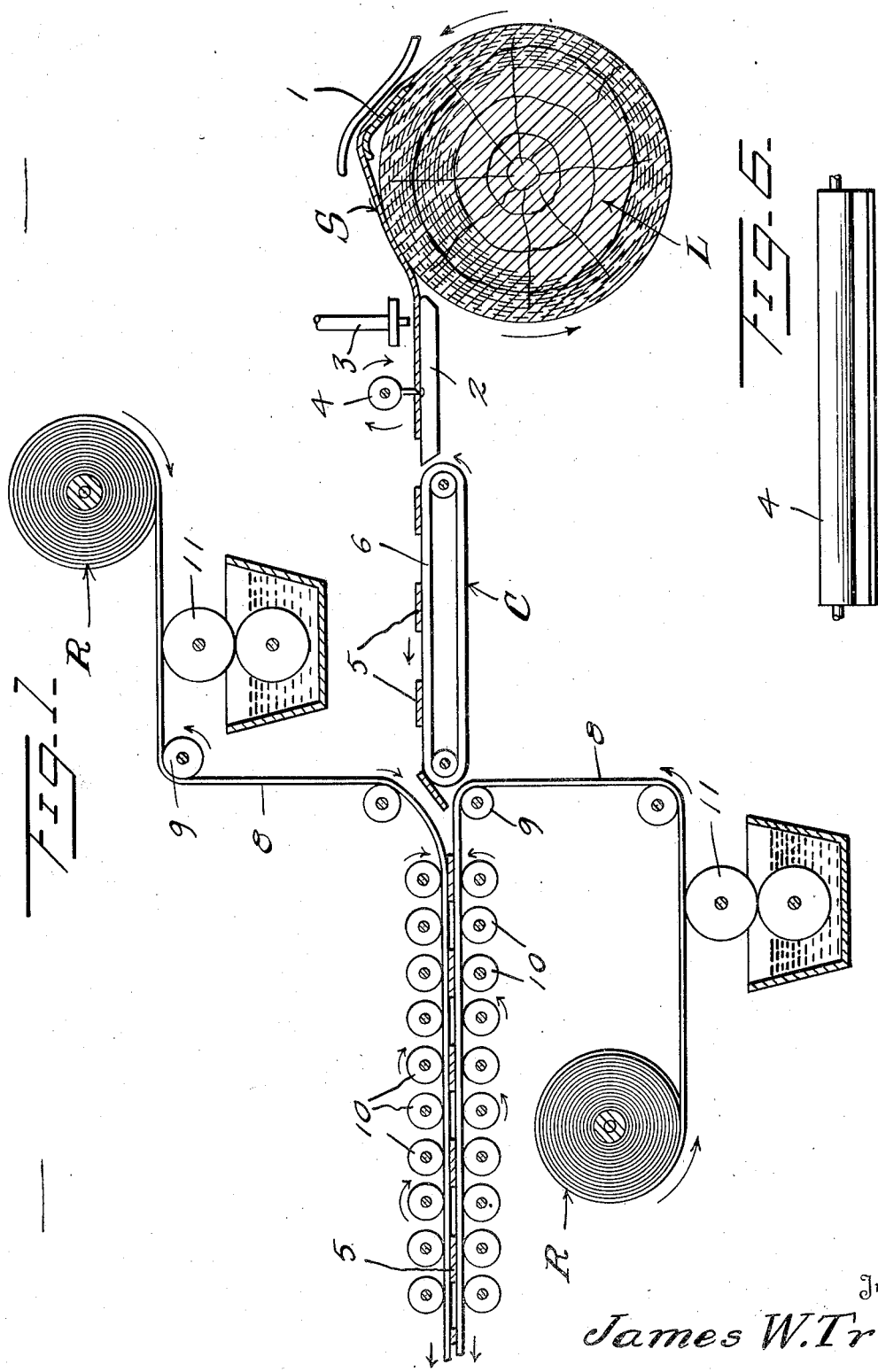

March 27, 1945.  J. W. TREW  2,372,617
METHOD OF PRODUCING COMPOSITE PANELS
Filed Dec. 31, 1942   2 Sheets-Sheet 2
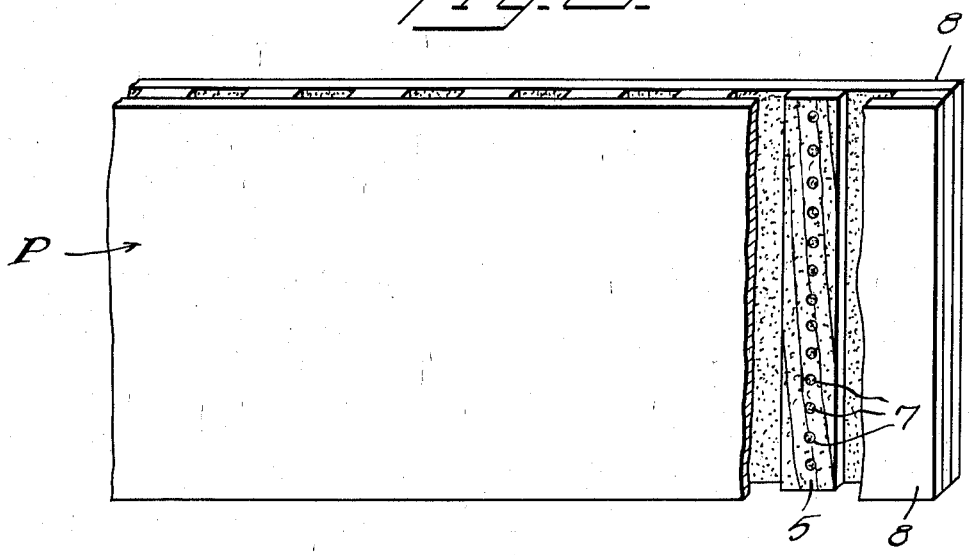
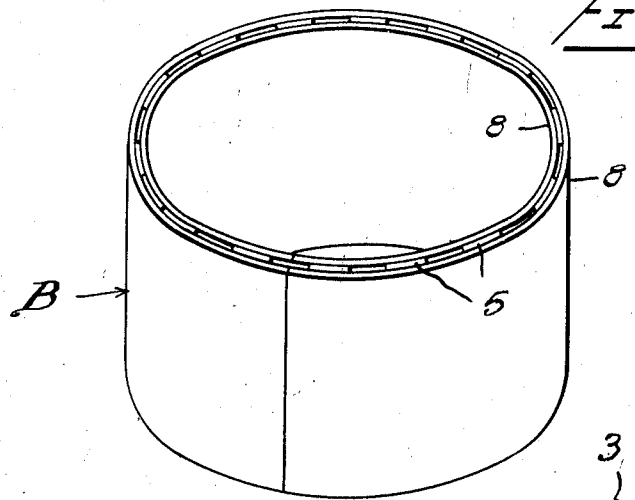
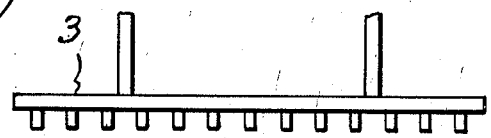
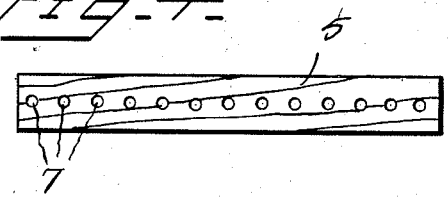
Inventor
James W. Trew
By Coleman & Lawson
Attorney Patented Mar. 27, 1945

2,372,617

UNITED STATES PATENT OFFICE 2,372,617

METHOD OF PRODUCING COMPOSITE PANELS

James W. Trew, Gettysburg, Pa.

Application December 31, 1942, Serial No. 470,896

2 Claims. (Cl. 154—2)

This invention relates to a method of making composite panels, and it is primarily an object of the invention to provide a method embodying the use of laminations of fibrous materials and wherein initially at least one of such laminations has a moisture content greater than the initial moisture content of the remainder of the laminations, and further wherein said laminations when in superimposed relation acquire by absorption substantially the same moisture content.

It is also an object of the invention to provide a method of this kind embodying a plurality of superimposed laminations, certain of said laminations comprising paper board made from a virgin pulp and the remaining of said laminations being wood veneer, and wherein the wood veneer, as applied, is of a moisture content greater than the moisture content of the laminations of paper board.

Another object of the invention is to provide a method of this kind wherein superimposed laminations are adhesively connected in a manner whereby the desired curing is effected without the use of an oven heat or other relatively high temperatures.

The invention also has for an object to provide a method for producing a composite panel of a character possessing sufficient strength to effectually withstand crushing pressure.

A still further object of the invention is to provide a method of this kind wherein wood veneer is interposed between laminations of paper board in a manner whereby the veneer is prevented from drying to a degree that it becomes brittle, and thus providing a panel having high shock resistance against fracture and which is particularly desirable when the panel is used in the production of boxes and baskets such as used in the shipment and storage of fruits and vegetables.

The invention also contemplates as an object to provide a method of producing a composite panel including the steps of interposing wood veneer between laminations of paper board in a manner whereby the veneer is effectually protected against exposure to the temperature, and thus retarding the loss of the moisture content of the veneer.

In order that the invention may be the better understood I will now proceed to describe the same with reference to the accompanying drawings, wherein:

Figure 1 is a diagrammatic view illustrating a suitable arrangement of mechanism for producing a composite panel in accordance with an embodiment of the invention;

Figure 2 is a fragmentary view in perspective of a panel produced in accordance with the invention as herein embodied;

Figure 3 is a perspective view of a panel produced in accordance with the present invention and set in a cylindrical form;

Figure 4 is a view in plan of one of the veneer slabs or slats herein employed;

Figure 5 is a fragmentary front elevational view, and of a diagrammatic character, of the punch illustrated in Figure 1; and Figure 6 is a front elevational view of the veneer cutting roller as comprised in Figure 1.

In the embodiment of the invention as herein comprised, the veneer strip S is cut or sliced in the usual way, as at 1, from a log L. The manner of mounting and rotating the log L as well as the cutting or slicing means 1 forms no part of the present invention and may be as desired. It is to be stated, however, that the log L before cutting or slicing is subjected to a treatment of steam or otherwise so that said log L and the strip S cut or sliced therefrom will have a water or moisture content of approximately 40%.

As the strip S leaves the log L, it passes over a table 2 and the strip S as it passes over said table 2 is intermittently perforated by a suitably mounted and operated punch 3, herein indicated as of a reciprocating type. As the strip S passes along the table 2 beyond or away from the punch 3, the strip S is cut thereacross by a suitable rotary cutter 4, or otherwise as may be desired, into the relatively wide and substantially flat slats 5. As these slats 5 leave the table 2 they are received upon the upper stretch 6 of an endless conveyor C. This conveyor C is to be constructed and operated as preferred as it is only required that the speed of travel of the stretch 6 away from the table 2 be greater than the speed of travel of the strip S and the cut slats 5 along the table 2. This difference in the speed of travel between the upper stretch 6 of the conveyor C and the travel of the veneer strip S and the slats 5 along the table 2 results in adjacent slats 5 being delivered upon the upper stretch 6 of the conveyor C in spaced relation, as is clearly illustrated in Figure 1 of the drawings. The extent of spacing between adjacent slats 5 is determined by the relative difference in speeds just referred to, and in the present operation of the method it has been found desirable that such spacing substantially equal the width of a slat 5. It has also been found desirable to have such width of each of the slats 5 substantially two and one-half inches, although it is to be understood that the invention is not to be limited in this respect.

As is illustrated in Figure 4 of the drawings, the punch 3 is of a type to produce a series of relatively small openings or perforations 7 in alignment transversely of the strip S or lengthwise of the cut slats 5. The operations or reciprocations of the punch 3 are so timed with respect to the speed of travel of the strip S to so locate the openings or perforations 7 to be positioned at substantially the transverse center of each of the slats 5.

As the slats 5 are discharged from the upper stretch 6 of the conveyor C they are received in substantially equi-distantly spaced relation between the superimposed webs or laminations 8 of paper board. Each of these webs or laminations 8 initially has a water or moisture content of approximately 4%. These webs or laminations 8 travel from their rolls R or other source to the suitably positioned guide rolls 9 and then between the pressure and traction rolls 10. The mounting and manner of driving these rolls 10 form no part of the present invention and, therefore, a detailed description of such mounting and operation is not believed necessary.

In the present embodiment of the invention, the slats 5 are delivered upon the lower web or lamination 8 in advance of but closely adjacent to the pressure and traction rolls 10 so that said slats 5 are carried along with the webs or laminations 8 between the rolls 10.

At a suitable point in advance of the pressure and traction rolls 10, the inner or opposed surfaces of the webs or laminations 8 contact the distributing rollers 11 whereby said surfaces of the webs or laminations 8 have applied thereto a coating of water soluble adhesive so that as the webs or laminations 8 and the interposed slats 5 pass between the pressure and traction rolls 10, the said webs or laminations 8 between the slats 5 are adhesively connected and the said webs or laminations 8 and the slats 5 are also adhesively connected as the laminations 8 and the slats 5 pass between the pressure and traction rolls 10. The adhesive will also be forced through the openings or perforations 7 of the slats 5 and thus further assure the desired maintenance of the assembled webs or laminations 8 and the interposed slats 5.

As the initial water or moisture content of the webs or laminations 8 is materially less than the initial water or moisture content of the slats 5 received therebetween, the webs or laminations 8 will absorb water or moisture from the interposed slats 5 until the water or moisture contents of the webs or laminations 8 and the slats 5 are substantially equal. This result is obtained by having the webs or laminations 8 of such thicknesses with respect to the thicknesses of the slats 5 to effect saturation of the webs or laminations 8 when the water or moisture contents of the webs or laminations 8 and the slats 5 are approximately equal. This is of particular advantage as the wood or veneer slats 5 will be prevented from drying to a degree that they become brittle and thereby producing a panel having high shock resistance against fracture, and also to effectually withstand crushing pressure. This is particularly desirable when the panel is used in the production of boxes and baskets especially of the types used for the shipment and storage of fruits and vegetables.

In the completed panel, the webs or laminations 8 of paper board effectually protect the interposed slats 5 of wood veneer from exposure to the atmosphere, thus retarding the loss of water or moisture contents of said slats 5 and thereby materially prolonging the effective life of the panel. A panel fabricated in accordance with a method embodying the present invention also effectually overcomes warping which is so objectionable in commercial usages and the webs or laminations 8 assure at all times the outer surfaces of the panel being smooth and unbroken.

It is to be stated that by varying the thicknesses of the webs or panels 8 with respect to the interposed slats 5, the amount of reduction of the initial water or moisture content of the slats 5 may be regulated or varied as certain conditions may require, and at the present time the preferred operation of the method embodies the use of webs or laminations 8 and slats 5 of substantially the same thicknesses as hereinbefore described.

It is also to be stated that while in the method as hereinbefore described and as illustrated in the accompanying drawings the slats 5 are disclosed, it is to be stated that the method can be employed to the same advantage by having the veneer strip S pass between the webs or laminations 8 as a continuous or uncut web or lamination and, therefore, in referring in the appended claims to the laminations it is to be understood that the same is intended to include the idea of the wood veneer being in the form of slats or continuous and uncut.

In Figure 2 of the accompanying drawings the panel P produced in accordance with an embodiment of the present method is substantially flat and straight. However, the panel after it leaves the pressure rolls 10 can be set in any form or shape desired, such as a cylindrical panel B as illustrated in Figure 3, the substantially equally distributed water or moisture content of the fabricated panel B operating to facilitate the maintenance of such shape.

What is claimed is:

1. The method of producing a laminated panel which comprises running continuous strips of material in convergent superposed relation between spaced press members, applying adhesive to the opposing faces of the strips, feeding a veneer strip toward the convergent portions of the strips in a direction to enter between such convergent portions, cutting the veneer strip transversely to form separate sections, perforating the veneer strip at intervals so that each of the sections will have a plurality of perforations therethrough, and conveying the sections away from the cutting means and between the adhesive coated faces of the strips at a speed greater than the speed of movement of the veneer strip to the cutter whereby the sections are carried in spaced relation to position between the adhesive coated faces of the strips to be pressed between the strips by the press members, the perforations of the sections passing the adhesive material through these sections.

2. The method of producing a laminated panel, which comprises running continuous strips of material in convergent relation to opposed press members and moving the strips between the press members in spaced parallel relation, applying adhesive to the opposed faces of the strips, running a veneer strip across a supporting surface disposed substantially coplanar with the bight of the angle formed by the convergent portions of the strips, perforating the veneer strip at intervals transversely, then cutting the veneer strip transversely between the transverse perforations to form the veneer strip in sections each having perforations, and then conveying the sections from said supporting surface into the bight between the convergent portions of the strips at a speed greater than the speed of movement of the veneer strip across the supporting surface whereby the sections will be introduced at spaced intervals between the first strips and pressed therebetween by the press members, the apertures of the sections passing the adhesive material through the sections.

JAMES W. TREW.